United States Patent [19]

Skinner

[11] 4,060,055

[45] Nov. 29, 1977

[54] POULTRY CAGE STRUCTURE

[75] Inventor: Mark Skinner, Decatur, Ala.

[73] Assignee: Chore-Time Equipment, Inc., Milford, Ind.

[21] Appl. No.: 781,185

[22] Filed: Mar. 25, 1977

Related U.S. Application Data

[63] Continuation of Ser. No. 686,291, May 14, 1976, abandoned.

[51] Int. Cl.² ............................................. A01K 31/06
[52] U.S. Cl. ..................................................... 119/48
[58] Field of Search ........................ 119/48, 17, 18, 22

[56] References Cited

U.S. PATENT DOCUMENTS

| | | | |
|---|---|---|---|
| 2,105,058 | 1/1938 | Smith et al. | 119/48 |
| 2,264,959 | 12/1941 | Sperry et al. | 119/18 X |
| 3,274,972 | 9/1966 | Keen et al. | 119/48 |

Primary Examiner—Hugh R. Chamblee
Attorney, Agent, or Firm—Olson, Trexler, Wolters, Bushnell & Fosse, Ltd.

[57] ABSTRACT

Cage structure for poultry and the like comprises a number of cage rows mounted on A-frames in pyramided, stepped back, A-shaped, elevational array. Each cage row includes a bottom/back member and a top/front member joined together to form a row of cages of rectangular cross section. Each cage row is tipped forward to incline the cage bottom so as to urge eggs laid in the cages to roll forward into an egg collecting trough at the cage front. The bottom element of the bottom/back member forms at least a portion of the top of the cage row next below. A feeder trough forms a portion of each cage front.

7 Claims, 3 Drawing Figures

POULTRY CAGE STRUCTURE

This is a Continuation, of application Ser. No. 686,291, Filed: May 14, 1976, now abandoned.

BACKGROUND OF THE INVENTION

This invention relates generally to cages for poultry and like animals, and more particularly concerns cage structure which will securely retain a large number of birds or similar animals, yet which can be erected and maintained at low cost.

Modern poultry operations provide sophisticated equipment for maintaining large flocks of birds inside poultry houses of extended size. When these birds are properly cared for, high flock performance levels can be reached; that is, relatively large numbers of eggs can be obtained from the laying hens.

In many of these poultry operations, it is helpful to maintain the birds inside cages so that food and water can be delivered to the poultry accurately and economically and in rationed amounts. In addition eggs can be economically collected from laying flocks.

Large poultry cage arrays have, of course, been known for some time to the poultry care industry. Effective cage arrays are more or less incidentally disclosed in U.S. Pat. Nos. 3,523,519; 3,611,995; 3,776,191 and 3,893,423.

It is the general object of the present invention to provide a poultry cage structure or arrangement which can be inexpensively manufactured and assembled, yet which accommodates a large number of birds or like animals in an easy-to-care-for array.

A more specific object of the invention is to provide a poultry cage structure which can be manufactured from a relatively small amount of raw materials to provide a relatively extensive cage structure.

Another object is to provide a cage structure which can be easily shipped in its disassembled condition to an installation site.

Still another object is to provide a poultry cage structure which directs laid eggs in the cage to a conveniently located egg collector, thereby easing the task and lessening the expense of egg collecting.

An additional object is to provide a poultry cage structure which encourages the elimination of animal droppings at the cage rear, so as to permit these droppings to pass other cages and animals without befouling them.

A further object is to provide a cage structure in which cage the sizes and shapes are adapted to include more cages than could formerly be accommodated in a house of given size.

Other objects and advantages of the invention will become apparent upon reading the following detailed description and upon reference to the drawings. Throughout the drawings, like reference numerals refer to like parts.

DETAILED DESCRIPTION

While the invention will be described in connection with the preferred embodiment, it will be understood that it is not intended to limit the invention to this embodiment. On the contrary, it is intended to cover all alternatives, modifications and equivalents as may be included within the spirit and scope of the invention as defined by the appended claims.

Figure 1:
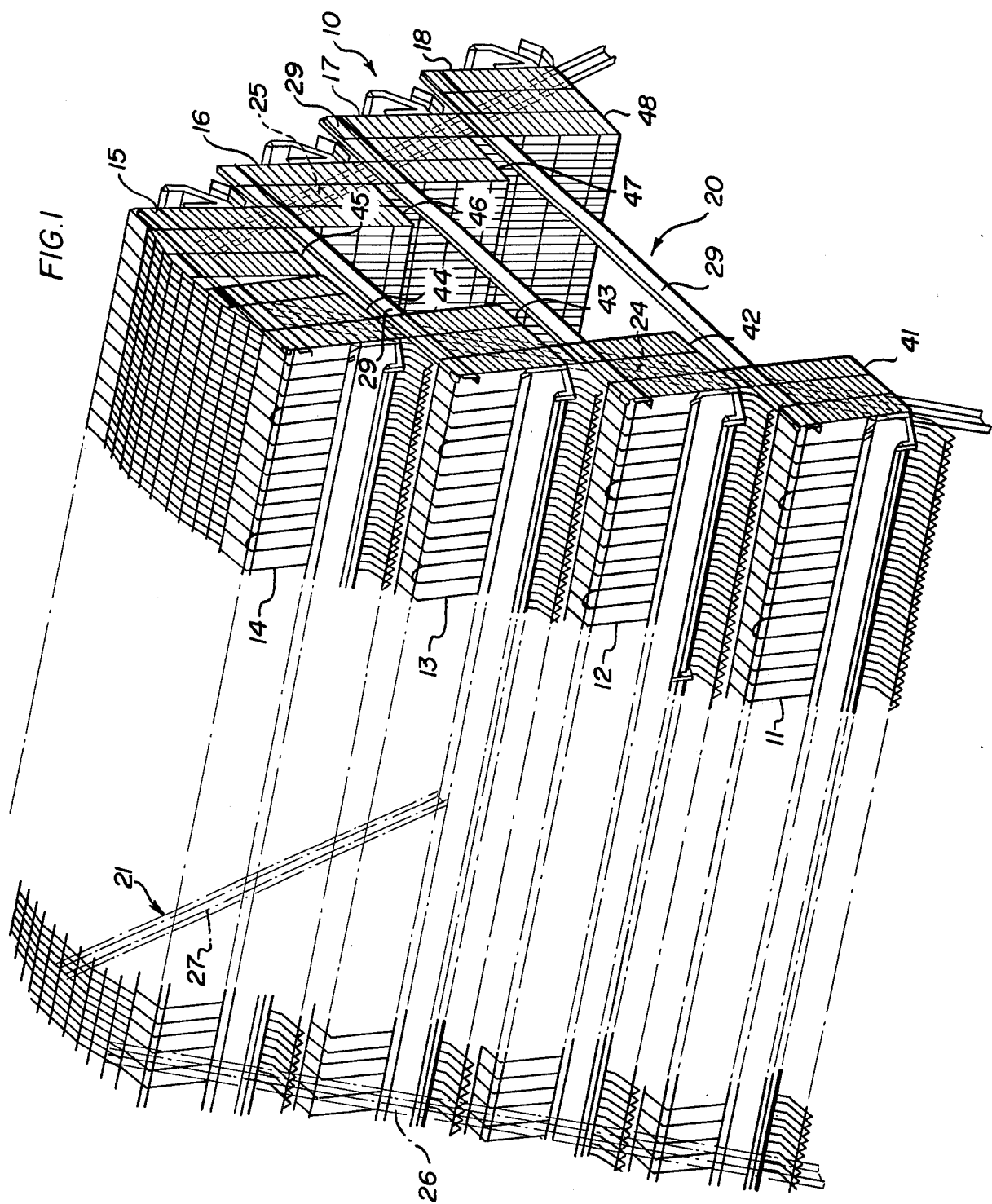
FIG. 1 is a perspective view showing the novel poultry cage structure as it appears when erected for use with poultry or like animals.

Turning first to FIG. 1, there is shown a poultry cage structure 10 embodying the present invention. In general, this cage structure 10 can be considered to include a plurality of a cage of rows 11-18. These cage rows 11-18 are carried in a stepped-back, pyramidal, A-shaped elevational array upon a number of A-frame support structures 20, 21. Here, each A-frame structure 20, 21 includes two diagonally oriented joists 24, 25 and 26, 27 respectively. Horizontally disposed cross braces 29 interconnect in the joists and provide rigid support for the cage rows 11-18. To minimize material expense and maximize structural strength in carrying out the invention, these joists 24-27 and cross braces 29 can be formed of channel iron of suitable dimension and strength. To further minimize expense, it is contemplated that these A-frame support elements will be welded together or otherwise interconnected in some inexpensive yet effective way.

In accordance with one aspect of the invention, the novel cage structure is designed to urge eggs laid in the cages to roll forward along the cage floor and into a collecting device provided at the front of each cage row. To this end, each cage row 11-18 is tipped forward, and is mounted in its tipped-forward condition upon the A-frame support structure 20. Here, this forward-tipped condition is provided by securing a top front cage corner 30 to a cross brace 29 at a strut end 31. The rear of each cage row 11-18 is also secured to the horizontal strut 29, but this interconnection is made at a point spaced apart from a top rear cage corner 33, as illustrated particularly in FIG. 2. These cage row-strut interconnections can be convieniently made by inexpensive clips 34 of appropriate design. Thus arranged, the cage rows 11-18 provide the illustrated rectangular cross sectional aspects, but each cage bottom 41-48 is inclined or tipped forward so as to urge eggs laid in the cage to roll toward the cage front.

Figure 3:
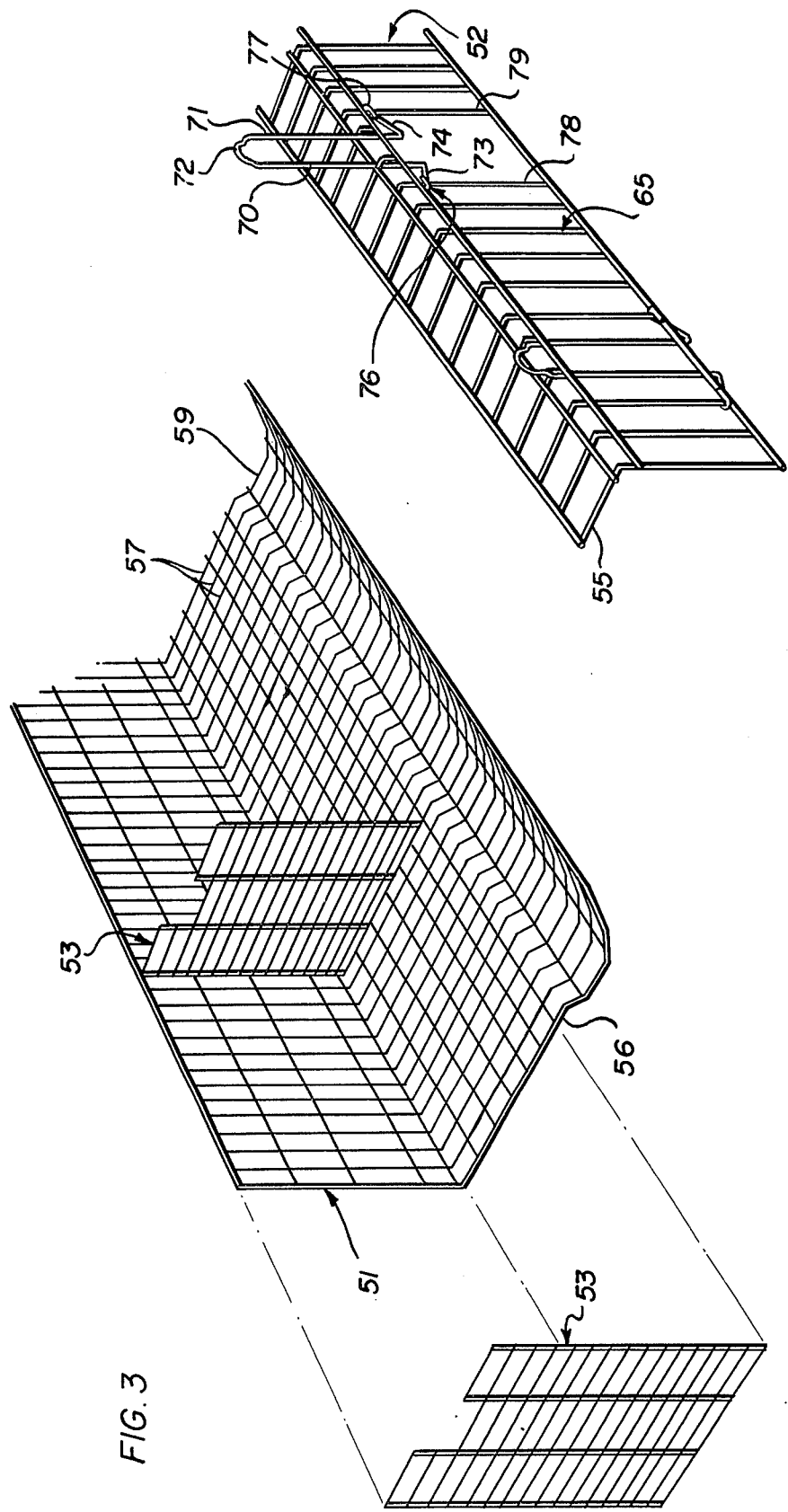
FIG. 3 is an exploded view showing cage-defining elements of the novel structure.

It is another feature of the invention that this cage structure minimizes cage fabrication time and attendant expenses. To this end, each cage row 11-18 is at least partly defined by a bottom/back member 51 and a top/front member 52 as illustrated in FIG. 3. These members 51-52 are L-shaped in general aspect, and can be fabricated of wire stock of appropriate strength and rigidity in known manner in a factory. Cage end partitions 53 can be similarily produced. These parts can be conveniently and inexpensively shipped in their unassembled condition, or they can be preliminarily assembled into the cage rows 11-18 for even faster on-site cage structure erection.

Figure 2:
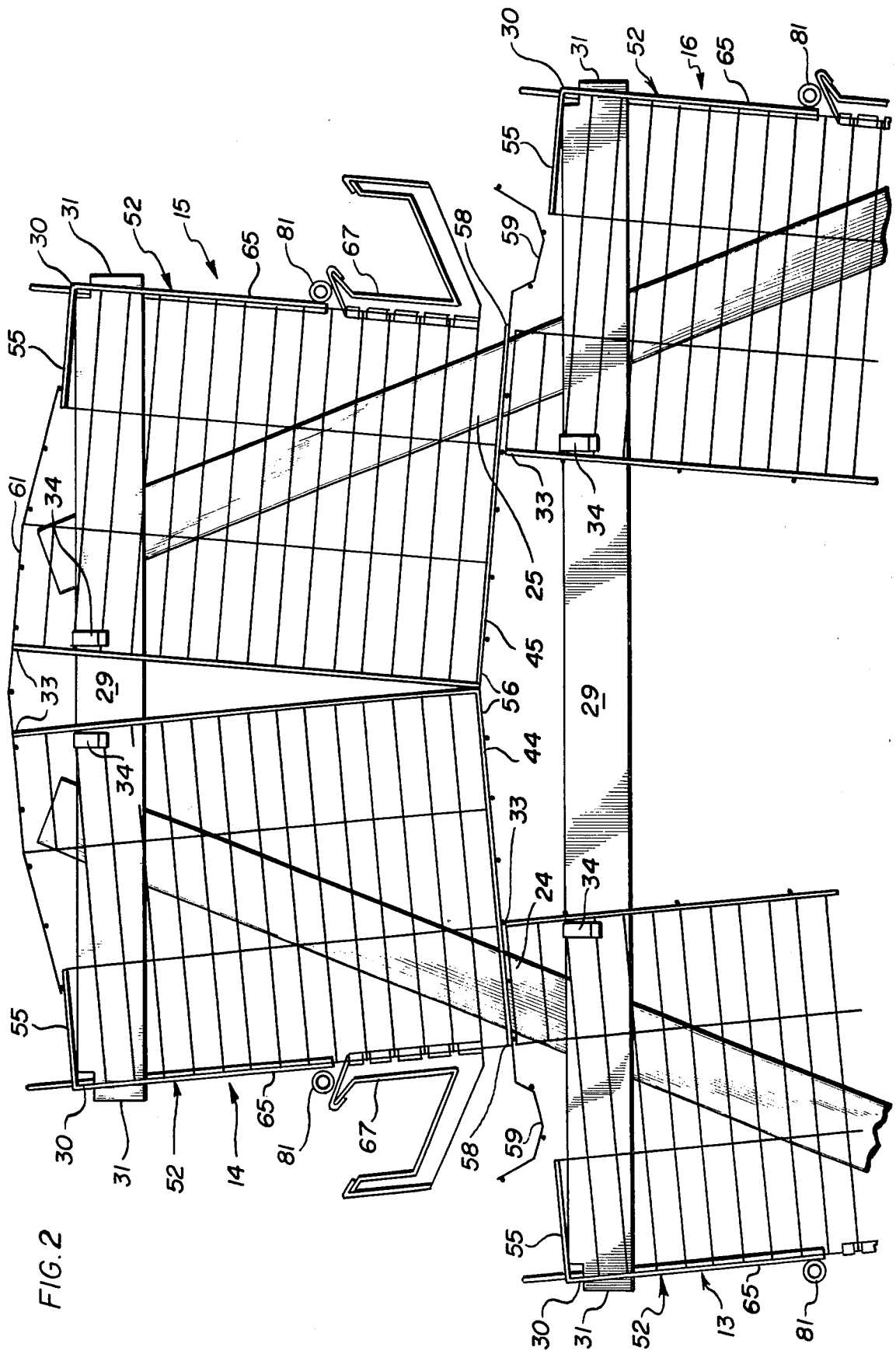
FIG. 2 is an elevational end view of the poultry cage structure shown in FIG. 1.

Examination of FIGS. 2 and 3 will reveal that the top-front member 52 includes a top element 55 extending over only the forward portion of the top of each cage row 11-18. Remaining portions of each cage row top are covered by forward portions of a bottom element 56 of the next higher bottom-back member 51. The cage bottom element 56 provides not only a floor to a relatively upper cage row, but also provides a roof or top to a relatively lower cage row.

In carrying out the invention, an egg collector trough can be formed in and provided on this bottom element 56. To this end, the laterally extending wires 57 of the bottom element 56 are deformed into a trough-like structure and are extended past a front bottom corner 58 of each cage row 50 to collect the eggs, but to collect them at a location outside the cages and out of harms way. To lessen cage costs in further accordance with the invention, this egg collector trough 59 also forms a portion of the top of the cage row located immediately below the egg collector trough. To prevent poultry or other contained animals from escaping from the top of the top cage rows 14 and 15, a wire mesh roof 61 is secured across the cage tops and to the top elements 55 of the top/front members 52.

To further minimize material expense in accordance with the invention, a front element 65 of the front/top member 52 extends only partially down the cage front. A laterally extending feed trough 67 is located below this front element 65; together with the front element 65, the trough 67 closes the cage row front and retains animals therein.

Each cage is provided with a gate to permit animals to be placed within the cage or removed easily. An inexpensive yet effective gate is provided in further accordance with the invention by forming the gate of two front bars 70 and 71 which are interconnected, as by a gate handle 72 at the cage top. The depending gate bar legs 73 and 74 are loosely reversely turned to form reverse-turn attachment eyelets 76 and 77. As illustrated in FIG. 3, the eyelets 76 and 77 engage adjacent cage bars 78 and 79 to permit the gate to be slid up and down, thereby opening and closing the cage front.

Pursuant to the invention, a waterer 81 is located adjacent to the feeder 67 and the cage row fronts. When these feeders and waterers are so located, the contained poultry or other animals are encouraged to face the cage front. This animal orientation in turn encourages animal dropings to be dropped out the cage row rear past lower cage rows without entering and befouling the lower cage rows and any animals occupying them.

The following is claimed as invention:

1. A cage structure for poultry and the like, comprising in combination, a plurality of cage rows mounted in steppedback, elevational array, each cage row including a plurality of cage end partitions, a separate, unitary L-shaped bottom/back member secured to the partitions and a separate, unitary L-shaped top/front member separated from the bottom/back member at the cage row top and front but secured to the end partitions to form a row of cages of rectangular cross-section, the L-shaped bottom/back member having a bottom element being extended forwardly from the cage row to define an egg collecting trough at the cage row front bottom, the L-shaped top/front member having a top element defining the forward portion only of the cage row top, the remaining portion of the cage row top being covered to prevent animal escape by the overhanging bottom/back member egg collecting trough of the cage row immediately above and to the rear, the L-shaped top/front member also having a front element defining the upper portion only of the cage row front, the cage structure further including feed trough means mounted to the cage row at the cage row lower front and defining the remaining portions of the cage row front.

2. A cage structure according to claim 1 wherein said top element of said top/front member extends less than halfway across the cage top, and said egg collecting trough extending from the cage row immediately above extends more than halfway across the cage top, the top element and the egg collecting trough thus completely defining the cage top.

3. A cage structure according to claim 1 including at least two interconnected front cage bars slidably mounted on said cage top/front member to form a gate member for permitting access to a cage in the cage row.

4. A cage stucture according to claim 1 including A-frame structure for mounting the plurality of cage rows in pyramided A-shaped elevational array.

5. A cage structure according to claim 4 including means for mounting each cage row on the A-frame structure with each cage row tipped forward to incline the cage bottom so as to urge eggs laid in the cage to roll forward along the tipped-forward cage bottom and into said egg collecting trough at the cage row lower front.

6. A cage structure according to claim 1 including waterer means mounted at the cage row front for supplying water to animals contained within the cage row to encourage animal droppings to be dropped out the cage row rear past lower cage rows without entering those lower cage rows.

7. A quickly-erected cage structure for poultry and the like, comprising, in combination, a plurality of cage rows in stepped-back, elevational array, each cage row including a separate but unitary prefabricated L-shaped bottom/back member and a separate but unitary prefabricated L-shaped top/front member joined together in use to form a row of cages of rectangular cross-section, the L-shaped bottom/back member bottom element being extended forwardly from the cage row to define an egg collecting trough at the cage row front/bottom, the L-shaped top/front member having a top element defining the forward portion only of the cage row top, the remaining portion of the cage row top being covered to prevent animal escape by the bottom/back member egg collecting trough of the cage row immediately above and to the rear, each cage row including a plurality of cage end partitions directly connected to said L-shaped top/front member and said L-shaped bottom/back member to form said cage rows, the cage structure further including mounting means for mounting the plurality of cage rows in said stepped elevational array with each row of rectangular cross-sectional cages tipped forward to incline the cage bottom and sides so as to urge eggs laid in the cage row to roll forward along the inclined cage row bottom and into the egg collecting means at the cage front.

* * * * *